[11] 3,597,049

[72] Inventor Toshinobu Ogura
Sakai-shi, Japan
[21] Appl. No. 810,094
[22] Filed Mar. 25, 1969
[45] Patented Aug. 3, 1971
[73] Assignee Minakta Camera Kabushiki Kaisha
Isaka, Japan

[54] EXTREME WIDE ANGLE LENS SYSTEM
3 Claims, 5 Drawing Figs.
[52] U.S. Cl. ............................................. 350/198,
350/205, 350/214
[51] Int. Cl. ....................................................G02b13/00,
G02b 9/00
[50] Field of Search........................................ 350/198,
205, 214

References Cited
UNITED STATES PATENTS
2,969,713   1/1961   Mukai .......................... 350/214
3,132,199   5/1964   Zimmermann et al........ 350/214
FOREIGN PATENTS
475,134   1937   Great Britain................ 350/205

*Primary Examiner*—David Schonberg
*Assistant Examiner*—Paul A. Sacher
*Attorney*—Watson, Cole, Grindle and Watson ABSTRACT: A wide-angle lens system having twelve elements, a focal length of 1.0, a focal aperture of 1:2.8, and a field angle of 180°, and wherein the radii of curvature of the refracting surfaces, the axial separations between consecutive refracting surfaces, the refractive indices of the individual lens elements, and the Abbe numbers for each of the lens elements are specified to correct lateral chromatic aberration.

INVENTOR
Toshinobu Ogura
BY Watson, Cole, Grindle + Watson
ATTORNEYS

EXTREME WIDE ANGLE LENS SYSTEM

BACKGROUND OF THE INVENTION

There are some extreme wide-angle lens system with an angle coverage of up to 180°. However, such prior lens system are not useful in practice because the lens structures have low light intensity owing to a comparatively small relative aperture which results from various problems such as difficulty in correcting the lateral chromatic aberration, the strong residual monochromatic aberrations, and the limited dimension of lens elements and so forth.

SUMMARY OF THE INVENTION

The primary object of the present invention is to provide an extreme wide-angle lens system with a relative aperture of up to F/2.8 by eliminating the said defects of prior lens systems and correcting the lateral chromatic aberration, which has been most difficult to remove, to the same degree as that of usual lens systems. Another object of the present invention is to provide an extreme wide-angle lens system which is applicable to a 35 mm. single lens reflex camera with no fear of contact with a reflecting mirror by making the back focal distance over twice the focal length. A further object of the present invention is to provide an extreme wide angle lens system having sufficient light intensity up to the border region corresponding to the half field angle of 90° with excellent image-forming ability so that this lens system is applicable for photographing a whole semispherical field of view when important objects prevail to the border region and is useful when the whole field of view is desired to form round image on film.

DESCRIPTION OF THE PREFERRED EMBODIMENT

Figure 1:
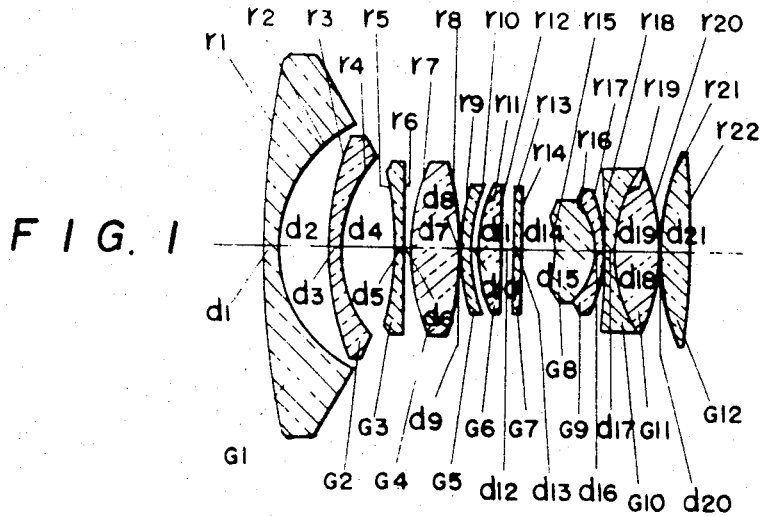
FIG. 1 shows the structure of the first embodiment of the present invention of an extreme wide-angle lens system.
Figure 2:
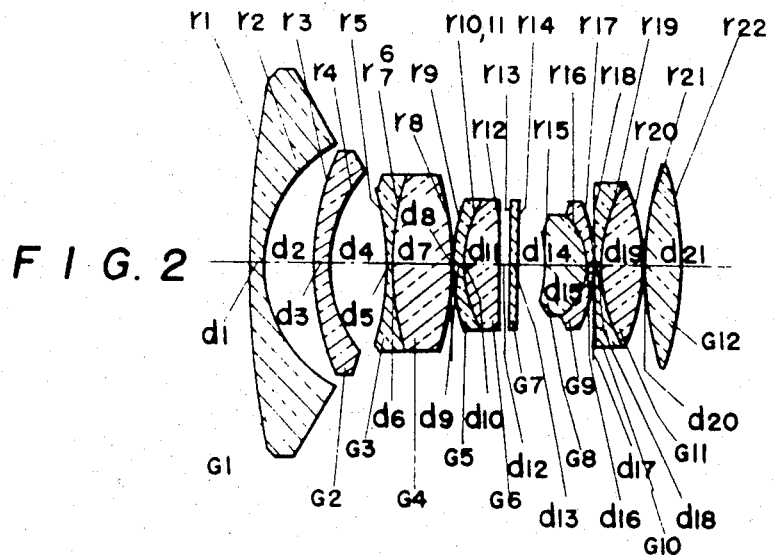
FIG. 2 shows the structure of the third embodiment of the present invention.

As shown in FIG. 1 and FIG. 2 an extreme wide-angle lens system of the present invention comprises twelve lens elements, including an interchangeable filter G 7, which are disposed in eight to 10 lens components. Both the first lens element G 1 and the second lens element G 2 are divergent meniscus lenses which are disposed with the convex surfaces facing to the object side, the third lens element G 3 is a divergent lens, the fourth lens element G 4 is a biconvex lens, the fifth lens element G 5 is a divergent meniscus lens which is disposed with the convex surface facing the object side, the sixth lens element G 6 is a convergent lens, the seventh lens element G 7 is a filter, the eighth lens element G 8 and the ninth lens element G 9 composing a cemented doublet are a convergent meniscus lens and a divergent meniscus lens, respectively, which are disposed with the convex surface facing the image side, the tenth lens element G 10 and the eleventh lens element G 11 composing a cemented convergent doublet are a divergent lens and a biconvex lens, respectively, and the twelfth lens element G 12 is a biconvex lens. A couple of G 3 and G 4 and a couple of G 5 and G 6 are either or both used as cemented doublets. An extreme wide-angle system of the present invention satisfies the following description conditions.

(a) $V_1 + V_2 > 105, \ V_3 > V_4$ (b) $(V_8 + V_{12})/V_9 > 3.2, \ V_{11} - V_{10} > 10$ (c) $(N_9 - N_8)/r_{15} < \dfrac{-0.06}{f}$ (d) $\dfrac{+0.4}{f} > \dfrac{N_4 - 1}{r_7} - \dfrac{N_3 - 1}{r_6} + \dfrac{N_6 - 1}{r_{11}} - \dfrac{N_5 - 1}{r_{10}} > \dfrac{-0.2}{f}$ (e) $\dfrac{r_{17}}{r_{15}} > \dfrac{r_{20}}{r_{18}} > \dfrac{-|r_{22}|}{r_{21}}$ where $r_1, r_2 ...$ : the radii of curvature of the refracting surfaces numbered in sequence from the object side, $d_1, d_2 ...$ : the axial separations between consecutive refracting surfaces, $N_1, N_2 ...$ : the refractive indices of lens elements, $V_1, V_2 ...$ : the Abbe numbers of lens elements, $f ...$ : the focal length of the whole system.

A filter G 7 can be removed from the system when unnecessary or can be positioned behind the last lens element G 12. Usually, a stop is positioned between G 6 and G 7.

Features and functions of the structure of the lens system of the present invention will be described in the following.

The first three lens elements from the object side are divergent lenses in order to let light pencils introduced at half field angle of 90° incline with not excessive angle in the lens system and to obtain a long back focal distance. The considerable lateral chromatic aberration produced therein must be reduced as much as possible and compensated with the aberration of the opposite sign to be produced by the subsequent convergent lens elements.

The condition (a) gives the range to be satisfied for this purpose. When the condition is not fulfilled, satisfactory correction cannot be attained with any selection of Abbe numbers of the lens elements in the rearward portion. The condition (b) is necessary for the three convergent lens elements in the rearward portion from the stop in order to correct the longitudinal chromatic aberration produced excessively by the selection of Abbe numbers in the front portion from the stop as mentioned in the condition (a) and to attain a further correction for the residual lateral chromatic aberrations.

It is necessary to obtain an appropriate value of the Petzval sum, since the lens system covers a half field angle as wide as of 90°. The condition (c) is an effective measure to compensate the negative tendency of the Petzval sum caused by the existence of the intensive divergent lens elements in the front portion of the lens system and to eliminate the spherical aberration produced by the convergent lens elements. However, in order to obtain a large aperture of up to F/2.8 for an extreme wide angle lens system, it is necessary to eliminate the higher order aberrations overcorrected by the condition (c) and to correct the coma. For this purpose the condition (d) must be satisfy regarding the refractive indices of air lenses or cemented surfaces formed by G 3 and G 4 and by G 5 and G 6. In order to reduce the magnitude of the spherical aberration and the astigmatism as much as possible while keeping a long back focal distance, it is necessary to dispose three lens elements in the rearward portion from the stop and the condition (e) is required for curvatures of the said elements.

Three embodiment of the present invention based on the above mentioned conditions are described in the following. G 7 is an interchangeable filter as mentioned already, and in cases the filter is removed or positioned at the last portion of the system. In the third embodiment, $d_6 = d_{10} = 0$ means cemented doublets.

EMBODIMENT I

[f=1,  1:2.8,  Field angle 2ω=180°,  Back focal distance=2.26]

| Radii of curvature | Axial separations | Refractive indices | Abbé Number |
|---|---|---|---|
| $r_1 = 9.8493$ | | | |
| | $d_1 = 0.13$ | $N_1 = 1.6010$ | $V_1 = 64.1$ |
| $r_2 = 1.3060$ | | | |
| | $d_2 = 0.5307$ | | |
| $r_3 = 2.9757$ | | | |
| | $d_3 = 0.12$ | $N_2 = 1.6700$ | $V_2 = 57.2$ |
| $r_4 = 1.3140$ | | | |
| | $d_4 = 0.5913$ | | |
| $r_5 = -3.1775$ | | | |
| | $d_5 = 0.1$ | $N_3 = 1.6204$ | $V_3 = 60.3$ |
| $r_6 = 32.062$ | | | |
| | $d_6 = 0.075$ | | |
| $r_7 = 3.1718$ | | | |
| | $d_7 = 0.5131$ | $N_4 = 1.6676$ | $V_4 = 41.9$ |
| $r_8 = -5.3920$ | | | |
| | $d_8 = 0.009$ | | |
| $r_9 = 2.3056$ | | | |
| | $d_9 = 0.1$ | $N_5 = 1.6214$ | $V_5 = 61.2$ |

EMBODIMENT I—Continued

[f=1. 1:2.8. Field angle 2ω=180°. Back focal distance=2.26]

| Radii of curvature | Axial separations | Refractive indices | Abbé Number |
|---|---|---|---|
| $r_{10}=1.1154$ | | | |
| $r_{11}=1.5001$ | $d_{10}=0.075$ | | |
| $r_{12}=-28.885$ | $d_{11}=0.2739$ | $N_6=1.7545$ | $V_6=32.8$ |
| $r_{13}=\infty$ | $d_{12}=0.1$ | | |
| $r_{14}=\infty$ | $d_{13}=0.0915$ | $N_7=1.5994$ | $V_7=40.8$ |
| $r_{15}=-1.4966$ | $d_{14}=0.3058$ | | |
| $r_{16}=-0.6905$ | $d_{15}=0.4331$ | $N_8=1.6388$ | $V_8=60.1$ |
| $r_{17}=-1.2414$ | $d_{16}=0.1$ | $N_9=1.7618$ | $V_9=26.5$ |
| $r_{18}=-7.5358$ | $d_{17}=0.009$ | | |
| $r_{19}=1.4093$ | $d_{18}=0.085$ | $N_{10}=1.7400$ | $V_{10}=37.5$ |
| $r_{20}=-2.0771$ | $d_{19}=0.51$ | $N_{11}=1.6230$ | $V_{11}=58.1$ |
| $r_{21}=3.0419$ | $d_{20}=0.009$ | | |
| $r_{22}=-16.393$ | $d_{21}=0.265$ | $N_{12}=1.5168$ | $V_{12}=64.2$ |
| | $\Sigma d=4.4265$ | | |

EMBODIMENT II

[f=1, 1:2.8, Field angle 2ω=180°, Back focal distance=2.26]

| Radii of curvature | Axial separations | Refractive indices | Abbé numbers |
|---|---|---|---|
| $r_1=9.4375$ | $d_1=0.1300$ | $N_1=1.6010$ | $V_1=64.1$ |
| $r_2=1.3054$ | $d_2=0.5304$ | | |
| $r_3=3.0619$ | $d_3=0.1200$ | $N_2=1.6204$ | $V_2=60.3$ |
| $r_4=1.2581$ | $d_4=0.5896$ | | |
| $r_5=-3.1790$ | $d_5=0.1000$ | $N_3=1.6204$ | $V_3=60.3$ |
| $r_6=6.3335$ | $d_6=0.0750$ | | |
| $r_7=3.2901$ | $d_7=0.5092$ | $N_4=1.7440$ | $V_4=44.9$ |
| $r_8=-4.4084$ | $d_8=0.0090$ | | |
| $r_9=2.3791$ | $d_9=0.1000$ | $N_5=1.6700$ | $V_5=57.1$ |
| $r_{10}=1.1269$ | $d_{10}=0.0750$ | | |
| $r_{11}=1.3096$ | $d_{11}=0.2476$ | $N_6=1.7545$ | $V_6=32.8$ |
| $r_{12}=-330.030$ | $d_{12}=0.1000$ | | |
| $r_{13}=\infty$ | $d_{13}=0.0915$ | $N_7=1.5994$ | $V_7=40.8$ |
| $r_{14}=\infty$ | $d_{14}=0.3013$ | | |
| $r_{15}=-1.5805$ | $d_{15}=0.4067$ | $N_8=1.6388$ | $V_8=60.1$ |
| $r_{16}=-0.6509$ | $d_{16}=0.1000$ | $N_9=1.7557$ | $V_9=27.2$ |
| $r_{17}=-1.3394$ | $d_{17}=0.0090$ | | |
| $r_{18}=-7.3099$ | $d_{18}=0.0850$ | $N_{10}=1.7400$ | $V_{10}=37.5$ |
| $r_{19}=1.4905$ | $d_{19}=0.4700$ | $N_{11}=1.5688$ | $V_{11}=56.0$ |
| $r_{20}=-1.8958$ | $d_{20}=0.0090$ | | |
| $r_{21}=3.4516$ | $d_{21}=0.3050$ | $N_{12}=1.5168$ | $V_{12}=64.2$ |
| $r_{22}=-4.9417$ | $\Sigma d=4.3634$ | | |

EMBODIMENT III

[f=1, 1:2.8, Field angle 2ω=180°, Back focal distance=2.26]

| Radii of curvature | Axial separations | Refractive indices | Abbé Numbers |
|---|---|---|---|
| $r_1=9.8377$ | $d_1=0.13$ | $N_1=1.6010$ | $V_1=64.1$ |
| $r_2=1.3114$ | $d_2=0.5558$ | | |
| $r_3=3.0629$ | $d_3=0.12$ | $N_2=1.6204$ | $V_2=60.3$ |
| $r_4=3.0629$ | $d_4=0.5975$ | | |
| $r_5=3.2069$ | $d_5=0.1$ | $N_3=1.6204$ | $V_3=60.3$ |
| $r_6=4.4599$ | | | |

EMBODIMENT III—Continued

[f=1. 1:2.8. Field angle 2ω=180°. Back focal distance=2.26]

| Radii of curvature | Axial separations | Refractive indices | Abbé Numbers |
|---|---|---|---|
| $r_7=4.4599$ | $d_6=0$ | | |
| $r_8=-3.3964$ | $d_7=0.6303$ | $N_4=1.7440$ | $V_4=44.9$ |
| | $d_8=0.009$ | | |
| $r_9=2.4672$ | $d_9=0.1$ | $N_5=1.6700$ | $V_5=57.1$ |
| $r_{10}=1.1609$ | $d_{10}=0$ | | |
| $r_{11}=1.1609$ | $d_{11}=0.3581$ | $N_6=1.7545$ | $V_6=32.8$ |
| $r_{12}=17.624$ | $d_{12}=0.1$ | | |
| $r_{13}=\infty$ | $d_{13}=0.0915$ | $N_7=1.5994$ | $V_7=40.8$ |
| $r_{14}=\infty$ | $d_{14}=0.2992$ | | |
| $r_{15}=-1.4674$ | $d_{15}=0.3929$ | $N_8=1.6388$ | $V_8=60.1$ |
| $r_{16}=-0.6287$ | $d_{16}=0.1$ | $N_9=1.7557$ | $V_9=27.2$ |
| $r_{17}=-1.3943$ | $d_{17}=0.009$ | | |
| $r_{18}=-28.137$ | $d_{18}=0.085$ | $N_{10}=1.7400$ | $V_{10}=37.5$ |
| $r_{19}=1.6430$ | $d_{19}=0.47$ | $N_{11}=1.5688$ | $V_{11}=56.0$ |
| $r_{20}=-2.0126$ | $d_{20}=0.009$ | | |
| $r_{21}=4.0703$ | $d_{21}=0.305$ | $N_{12}=1.5168$ | $V_{12}=64.2$ |
| $r_{22}=3.9130$ | $\Sigma d=4.4622$ | | |

FIG. 1 and FIG. 2 illustrate the structure of the lens system of the first and the third embodiments, respectively.

Figure 3:
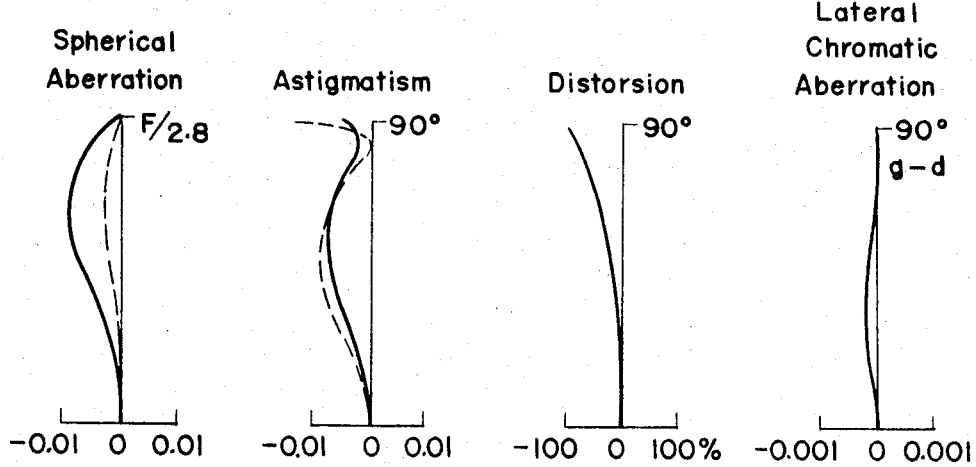
FIG. 3 shows the curves of various aberrations in the first embodiment.
Figure 4:
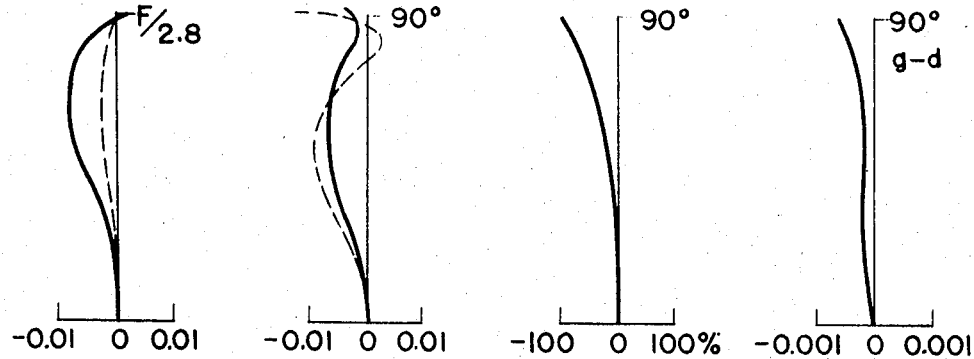
FIG. 4 shows the curves of various aberrations in the second embodiment.
Figure 5:
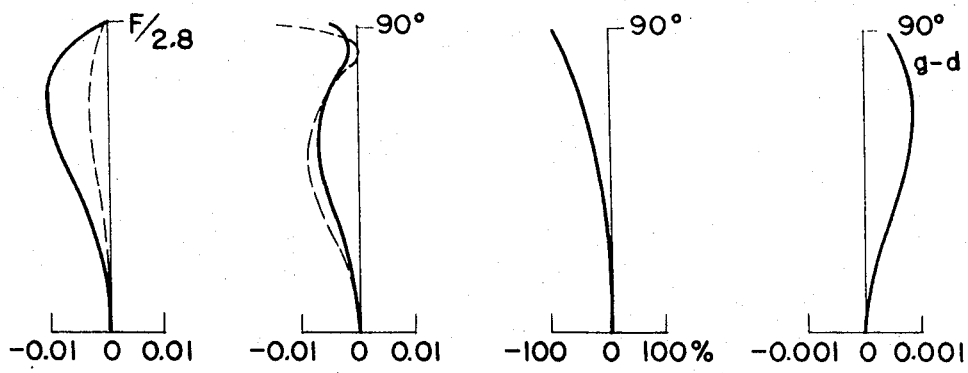
FIG. 5 shows the curves of various aberrations in the third embodiment.

FIG. 3, FIG. 4, and FIG. 5 show the behavior of the corrected aberrations of the first, the second, and the third embodiment, respectively, where each aberration is proved to be well corrected in spite of the aperture of up to F/2.8 at a half field angle of 90° while keeping a long back focal distance.

I claim:

1. A wide angle lens system having a focal length of 1.0, a focal aperture of 1:2.8, a field angle of 180°, and 12 elements successively mounted from the object side, comprising;

first and second lenses of the divergent meniscus type each having a convex surface facing the object,
   a third lens of the divergent type,
   a fourth lens of the biconvex type,
   a fifth lens of the divergent meniscus type having its convex surface facing the object,
   a sixth lens of the convergent type,
   a seventh element is a filter,
   eighth and ninth lens elements formed as a doublet lens, said eighth lens is of the convergent meniscus type, said ninth lens is of the divergent meniscus type, said eighth and ninth lens each having a convex surface facing the image,
   tenth and eleventh lenses formed as a convergent doublet lens, said tenth lens is a divergent lens and said eleventh lens is a biconvex lens,
   a twelfth lens of the biconvex type, and wherein the indicated lens elements have the following characteristics,

| | | | |
|---|---|---|---|
| $r_1=9.8493$ | $d_1=0.13$ | $N_1=1.6010$ | $V_1=64.1$ |
| $r_2=1.3060$ | $d_2=0.5307$ | | |
| $r_3=2.9757$ | $d_3=0.12$ | $N_2=1.6700$ | $V_2=57.1$ |
| $r_4=1.3140$ | $d_4=0.5913$ | | |
| $r_5=-3.1775$ | $d_5=0.1$ | $N_3=1.6204$ | $V_3=60.3$ |
| $r_6=32.062$ | $d_6=0.075$ | | |
| $r_7=3.1718$ | $d_7=0.5131$ | $N_4=1.6676$ | $V_4=41.9$ |
| $r_8=-5.3920$ | $d_8=0.009$ | | |
| $r_9=2.3056$ | $d_9=0.1$ | $N_5=1.6214$ | $V_5=61.2$ |
| $r_{10}=1.1154$ | $d_{10}=0.075$ | | |
| $r_{11}=1.5001$ | $d_{11}=0.2739$ | $N_6=1.7545$ | $V_6=32.8$ |
| $r_{12}=28.885$ | | | |

| | | | |
|---|---|---|---|
| $r_{13}=\infty$ | $d_{12}=0.1$ | | |
| $r_{14}=\infty$ | $d_{13}=0.0915$ | $N_7=1.5994$ | $V_7=40.8$ |
| $r_{15}=-1.4966$ | $d_{14}=0.3058$ | | |
| $r_{16}=-0.6905$ | $d_{15}=0.4331$ | $N_8=1.6388$ | $V_8=60.1$ |
| $r_{17}=-1.2414$ | $d_{16}=0.1$ | $N_9=1.7618$ | $V_9=26.5$ |
| $r_{18}=-7.5358$ | $d_{17}=0.009$ | | |
| $r_{19}=1.4093$ | $d_{18}=0.085$ | $N_{10}=1.7400$ | $V_{10}=37.5$ |
| $r_{20}=-2.0771$ | $d_{19}=0.51$ | $N_{11}=1.6230$ | $V_{11}=58.1$ |
| $r_{21}=3.0419$ | $d_{20}=0.009$ | | |
| $r_{22}=-16.393$ | $d_{21}=0.265$ | $N_{12}=1.5168$ | $V_{12}=64.2$ |
| | $\Sigma d=4.4265$ | | | wherein $r, r_2...r_{22}$ are the radii of curvature of the refracting surfaces as indicated in FIG. 1, $d_1, d_2...d_{21}$ are the axial separations between consecutive refracting surfaces, $N_1, N_2...N_{12}$ are the refractive indices of the respective lens elements, $V_1, V_2...V_{12}$ are the Abbe numbers for the respective lens elements, and the back focal distance of the lens system is 2.26.

2. A wide angle lens system having a focal length of 1.0, a focal aperture of 1:2.8, a field angle of 180°, and 12 elements successively mounted from the object side, comprising:
first and second lenses of the divergent meniscus type each having a convex surface facing the object,
a third lens of the divergent type,
a fourth lens of the biconvex type,
a fifth lens of the divergent meniscus type having its convex surface facing the object,
a sixth lens of the convergent type,
a seventh element is a filter,
eighth and ninth lens elements formed as a doublet lens, said eighth lens is of the convergent meniscus type, said ninth lens is of the divergent meniscus type, said eighth and ninth lens each having a convex surface facing the image,
tenth and eleventh lenses formed as a convergent doublet lens, said tenth lens is a divergent lens and said eleventh lens is a biconvex lens,
a twelfth lens of the biconvex type, and wherein the indicated lens elements have the following characteristics,

| | | | |
|---|---|---|---|
| $r_1=9.4375$ | $d_1=0.1300$ | $N_1=1.6010$ | $V_1=64.1$ |
| $r_2=1.3054$ | $d_2=0.5304$ | | |
| $r_3=3.0619$ | $d_3=0.1200$ | $N_2=1.6204$ | $V_2=60.3$ |
| $r_4=1.2581$ | $d_4=0.5896$ | | |
| $r_5=-3.1790$ | $d_5=0.1000$ | $N_3=1.6204$ | $V_3=60.3$ |
| $r_6=6.3335$ | $d_6=0.0750$ | | |
| $r_7=3.2901$ | $d_7=0.5092$ | $N_4=1.7440$ | $V_4=44.9$ |
| $r_8=-4.4084$ | $d_8=0.0090$ | | |
| $r_9=2.3791$ | $d_9=0.1000$ | $N_5=1.6700$ | $V_5=57.1$ |
| $r_{10}=1.1269$ | $d_{10}=0.0750$ | | |
| $r_{11}=1.3096$ | $d_{11}=0.2476$ | $N_6=1.7545$ | $V_6=32.8$ |
| $r_{12}=-330.030$ | $d_{12}=0.1000$ | | |
| $r_{13}=\infty$ | $d_{13}=0.0915$ | $N_7=1.5994$ | $V_7=40.8$ |
| $r_{14}=\infty$ | $d_{14}=0.3013$ | | |
| $r_{15}=-1.5805$ | $d_{15}=0.4067$ | $N_8=1.6388$ | $V_8=60.1$ |
| $r_{16}=-0.6509$ | $d_{16}=0.1000$ | $N_9=1.7557$ | $V_9=27.2$ |
| $r_{17}=-1.3394$ | $d_{17}=0.0090$ | | |
| $r_{18}=-7.3099$ | $d_{18}=0.0850$ | $N_{10}=1.7400$ | $V_{10}=37.5$ |
| $r_{19}=1.4905$ | $d_{19}=0.4700$ | $N_{11}=1.5688$ | $V_{11}=56.0$ |
| $r_{20}=-1.8958$ | $d_{20}=0.0090$ | | |
| $r_{21}=3.4516$ | $d_{21}=0.3050$ | $N_{12}=1.5168$ | $V_{12}=64.2$ |
| $r_{22}=-4.9417$ | $\Sigma d=4.3634$ | | | wherein $r, r_2...r_{22}$ are the radii of curvature of the refracting surfaces as indicated in FIG. 1, $d_1, d_2...d_{21}$ are the axial separations between consecutive refracting surfaces, $N_1, N_2...N_{12}$ are the refractive indices of the respective lens elements, $V_1, V_2...V_{12}$ are the Abbe numbers for the respective lens elements, and the back focal distance of the lens system is 2.26.

3. A wide angle lens system having a focal length of 1.0, a focal aperture of 1:2.8, a field angle of 180°, and 12 elements successively mounted from the object side, comprising;
first and second lenses of the divergent meniscus type each having a convex surface facing the object,
a third lens of the divergent type,
a fourth lens of the biconvex type,
a fifth lens of the divergent meniscus type having its convex surface facing the object,
a sixth lens of the convergent type,
a seventh element is a filter,
eighth and ninth lens elements formed as a doublet lens, said eighth lens is of the convergent meniscus type, said ninth lens is of the divergent meniscus type, said eighth and ninth lens each having a convex surface facing the image,
tenth and eleventh lenses formed as a convergent doublet lens, said tenth lens is a divergent lens and said eleventh lens is a biconvex lens,
a twelfth lens of the biconvex type, and wherein the indicated lens elements have the following characteristics,

| | | | |
|---|---|---|---|
| $r_1=9.8377$ | $d_1=0.13$ | $N_1=1.6010$ | $V_1=64.1$ |
| $r_2=1.3114$ | $d_2=0.5558$ | | |
| $r_3=3.0629$ | $d_3=0.12$ | $N_2=1.6204$ | $V_2=60.3$ |
| $r_4=3.0629$ | $d_4=0.5975$ | | |
| $r_5=3.2069$ | $d_5=0.1$ | $N_3=1.6204$ | $V_3=60.3$ |
| $r_6=4.4599$ | $d_6=0$ | | |
| $r_7=4.4599$ | $d_7=0.6303$ | $N_4=1.7440$ | $V_4=44.9$ |
| $r_8=-3.3964$ | $d_8=0.009$ | | |
| $r_9=2.4672$ | $d_9=0.1$ | $N_5=1.6700$ | $V_5=57.1$ |
| $r_{10}=1.1609$ | $d_{10}=0$ | | |
| $r_{11}=1.1609$ | $d_{11}=0.3581$ | $N_6=1.7545$ | $V_6=32.8$ |
| $r_{12}=17.624$ | $d_{12}=0.1$ | | |
| $r_{13}=\infty$ | $d_{13}=0.0915$ | $N_7=1.5994$ | $V_7=40.8$ |
| $r_{14}=\infty$ | $d_{14}=0.2992$ | | |
| $r_{15}=-1.4674$ | $d_{15}=0.3929$ | $N_8=1.6388$ | $V_8=60.1$ |
| $r_{16}=-0.6287$ | $d_{16}=0.1$ | $N_9=1.7557$ | $V_9=27.2$ |
| $r_{17}=-1.3943$ | $d_{17}=0.009$ | | |
| $r_{18}=-28.137$ | $d_{18}=0.085$ | $N_{10}=1.7400$ | $V_{10}=37.5$ |
| $r_{19}=1.6430$ | $d_{19}=0.47$ | $N_{11}=1.5688$ | $V_{11}=56.0$ |
| $r_{20}=-2.0126$ | $d_{20}=0.009$ | | |
| $r_{21}=4.0703$ | $d_{21}=0.305$ | $N_{12}=-1.5168$ | $V_{12}=64.2$ |
| $r_{22}=3.9130$ | $\Sigma d=4.4622$ | | | wherein $r, r_2...r_{22}$ are the radii of curvature of the refracting surfaces as indicated in FIG. 2, $d_1, d_2...d_{21}$ are the axial separations between consecutive refracting surfaces, $N_1, N_2...N_{12}$ are the refractive indices of the respective lens elements, $V_1, V_2...V_{12}$ are the Abbe numbers for the respective lens elements, and the back focal distance of the lens system is 2.26.